(12) United States Patent
Bunker et al.

(10) Patent No.: US 6,234,755 B1
(45) Date of Patent: May 22, 2001

(54) METHOD FOR IMPROVING THE COOLING EFFECTIVENESS OF A GASEOUS COOLANT STREAM, AND RELATED ARTICLES OF MANUFACTURE

(75) Inventors: Ronald Scott Bunker, Niskayuna; Jeremy Clyde Bailey, Middle Grove, both of NY (US); Ching-Pang Lee, Cincinnati, OH (US); Nesim Abuaf, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/411,206

(22) Filed: Oct. 4, 1999

(51) Int. Cl.[7] .................................................... F01D 5/18
(52) U.S. Cl. ..................................... 416/97 R; 416/241 R
(58) Field of Search ............................... 415/115, 116, 415/200; 416/97 R, 96 R, 96 A, 241 R, 241 B; 29/889.7, 889.72, 889.721, 527.2; 427/282, 287; 428/596, 632, 633, 937

(56) References Cited

U.S. PATENT DOCUMENTS

| | | | |
|---|---|---|---|
| 4,669,957 | * | 6/1987 | Phillips et al. ..................... 416/97 R |
| 4,684,323 | * | 8/1987 | Field ................................... 416/97 R |
| 4,743,462 | * | 5/1988 | Radzavich et al. ..................... 427/34 |
| 5,130,163 | * | 7/1992 | Clingman et al. ..................... 427/57 |
| 5,223,320 | | 6/1993 | Richardson . |
| 5,458,461 | | 10/1995 | Lee et al. . |
| 5,651,662 | | 7/1997 | Lee et al. . |
| 5,660,525 | | 8/1997 | Lee et al. . |
| 5,902,647 | * | 5/1999 | Venkataramani et al. ........... 247/454 |
| 5,981,091 | * | 11/1999 | Rickerby et al. ..................... 428/670 |
| 5,985,122 | * | 11/1999 | Conner ................................... 205/84 |

FOREIGN PATENT DOCUMENTS 2127105  4/1984  (GB) .

* cited by examiner

Primary Examiner—F. Daniel Lopez
Assistant Examiner—Ninh Nguyen
(74) Attorney, Agent, or Firm—Noreen C. Johnson; Douglas E. Stoner

(57) ABSTRACT

A method is described for improving the cooling effectiveness of a fluid which flows through a row of passage holes in a substrate (e.g., a turbine component), out to a high-temperature surface of the substrate. The method involves forming a slot over the holes, within the high temperature surface of the substrate. The slot can be formed within protective coatings applied over the substrate. Alternatively, it can be formed partially within the substrate, and partially within the protective coatings. Movement of a film coolant through the substrate and into the slot results in greater cooling effectiveness. Related articles are also described.

41 Claims, 10 Drawing Sheets

BASELINE ROUND HOLE

MODELED TRENCH
← FLOW

METHOD FOR IMPROVING THE COOLING EFFECTIVENESS OF A GASEOUS COOLANT STREAM, AND RELATED ARTICLES OF MANUFACTURE

BACKGROUND OF THE INVENTION

This invention relates generally to substrates used in a high-temperature environment. More particularly, it relates to methods for protecting the substrates from damage in such an environment.

Various types of materials, such as metals and ceramics, are used for components which may be exposed to a high-temperature environment. Aircraft engine parts represent examples of these types of components. A variety of approaches have been used to raise the operating temperature at which the metal components can be used. For example, one approach involves the use of protective coatings on various surfaces of the component, e.g., a turbine engine airfoil. The coatings are usually ceramic-based, and are sometimes referred to as thermal barrier coatings or "TBC's".

The TBC's are typically used in conjunction with internal cooling channels within the airfoil, through which cool air is forced during engine operation. As an example, a pattern of cooling holes may extend from a relatively cool surface of an airfoil to a "hot" surface which is exposed to gas flow at combustion temperatures of at least about 1000° C. The technique is sometimes referred to as "discrete hole film cooling". Cooling air, usually bled off from the engine's compressor, is typically bypassed around the turbine engine's combustion zone and fed through the cooling holes to the hot surface. The ratio of the cooling air mass flux (the product of air velocity times density) to the mass flux of the hot gas flowing along the hot surface (e.g., a combustion product) is sometimes referred to as the "blowing ratio". The cooling air forms a protective "film" between the hot surface and the hot gas flow, preventing melting or other degradation of the component, as described in U.S. Pat. No. 5,458,461 (C. P. Lee et al).

Film cooling performance may be characterized in several ways. One relevant indication of performance is known as the adiabatic wall film cooling effectiveness, sometimes referred to herein as the "cooling effectiveness". This particular parameter is related to the concentration of film cooling fluid at the surface being cooled. In general, the greater the cooling effectiveness, the more efficiently can the surface be cooled. A decrease in cooling effectiveness requires greater amounts of cooling air to try to maintain a certain cooling capacity. This requirement in turn diverts air away from the combustion zone. This can lead to other problems, such as greater air pollution resulting from non-ideal combustion, and less efficient engine operation. In the case of a turbine engine airfoil, effective film cooling requires that the film adhere to the hot surface of the airfoil, with as little mixing as possible with the hotter combustion gases.

A method for increasing cooling effectiveness is described in U.S. patent application Ser. No. 09/285,966 of R. Campbell et al, filed on Apr. 5, 1999 and assigned to the assignee of the present invention (and incorporated herein by reference). In that disclosure, a coolant stream moving through passage holes in a substrate is purposefully disrupted by the presence of an exit site on the "hot" side of the substrate. The exit site is preferably in the form of a crater, and may be contained within a thermal barrier coating applied to the hot side. (Passage holes are sometimes referred to herein as "film cooling holes").

One method of forming such a crater is described in U.S. Pat. No. 5,902,647 of M. Borom et al, which is incorporated herein by reference. In some embodiments of that invention, film cooling holes are temporarily filled with a masking material which is extruded into the holes from the backside (i.e., the "cold" side) of a turbine substrate. The masking material flows through the holes and exits at the hot side of the substrate. When the masking material exits the hole, it is cured, and forms a protrusion to which thermal barrier coatings do not adhere. After the coatings are applied, the masking material is removed to uncover the passage holes, which also results in the desired exit site geometry.

The processes described in the referenced patent applications are very suitable for increasing cooling effectiveness in many situations. However, new methods for enhancing the performance of the coolant stream are still desired in the art. The methods should be especially applicable to rows of film cooling holes in turbine engine components exposed to very high operating temperatures. More specifically, the methods should result in a film hole geometry in which cooling air exiting the holes adheres significantly to the hot surface of the substrate. These methods should also serve to minimize the undesirable mixing of cooling air with hot combustion gases.

Moreover, the new methods should not interfere with other functions of a particular component, e.g., the efficient operation of a turbine engine, or the strength and integrity of turbine engine parts. The methods should also be compatible with processes used to apply thermal barrier coating systems. In some instances, it would also be very desirable if the methods did not require access to the backside of a turbine component, e.g., an enclosed, internal section of the component. Finally, the implementation of these methods should preferably not involve a substantial cost increase in the manufacture or use of the relevant component, or of a system in which the component operates.

SUMMARY OF THE INVENTION

One embodiment of this invention is a method for improving the cooling effectiveness of a fluid which flows through a row or other pattern of passage holes in a substrate, out to a high-temperature surface of the substrate. The method comprises forming a slot over the holes, within the high temperature surface of the substrate. In some preferred embodiments, the depth of the slot is less than the average throat diameter of the holes. The substrate can comprise one row or pattern of holes, or multiple rows or patterns of holes. The substrate is usually covered by one or more coatings, e.g., a thermal barrier coating.

In some embodiments, the slot is formed by a technique comprising the following steps:

(a) covering each hole with a curable plug material;
(b) curing the plug material;
(c) applying a mask over the row or pattern of holes, wherein the mask has dimensions substantially identical to pre-selected dimensions for the slot;
(d) applying a coating over the substrate and the mask;
(e) removing the mask; and
(f) removing the plug material.

The coating is often a TBC system, which includes a bond layer and a ceramic overcoat. The bond layer is usually formed of a noble metal-aluminide material or an MCrAlY material, where M is selected from the group consisting of Fe, Ni, Co, and mixtures of any of the foregoing. The ceramic overcoat is usually zirconia-based, and is often applied over the bond layer by a thermal spray process.

In some embodiments, the slot (i.e., its depth) is located entirely within coatings deposited on the substrate, with the substrate surface serving as the slot bottom. In other embodiments, the lower portion of the slot is disposed within the substrate itself, while the upper portion of the slot is disposed within the coating thickness. Moreover, the depth of the slot is often less than the average throat diameter of the passage holes.

An article in the form of a substrate is also described, comprising:

(I) a first surface exposed to a first fluid;

(II) a second surface exposed to a hotter second fluid (intermittently exposed, e.g., during operation of a turbine engine), and spaced from said first surface;

(III) at least one row or other pattern of passage holes extending through the substrate from the first surface to a slot on the second surface; said holes having an average throat diameter d; and (IV) at least one coating, covering the portion of the second surface exclusive of the slot;

wherein the slot has a bottom surface substantially parallel to the second surface, and wherein the bottom surface of the slot is in fluid communication with the passage holes.

In the case of a turbine engine substrate, the features of this invention provide several important advantages. For example, film coolant exiting the passage holes stays in close contact with the hot surface, rather than separating from it quickly, and undesirably mixing with the combustion gases. This in turn results in greater cooling effectiveness for the component.

Further details regarding the various embodiments are described below.

DETAILED DESCRIPTION OF THE INVENTION

Any substrate which is exposed to high temperatures and requires cooling can be used for this invention. Examples include ceramics or metal-based materials. Non-limiting examples of metals related to this invention are steel, aluminum, refractory metals such titanium; and superalloys, such as those based on nickel, cobalt, or iron.

Figure 1:
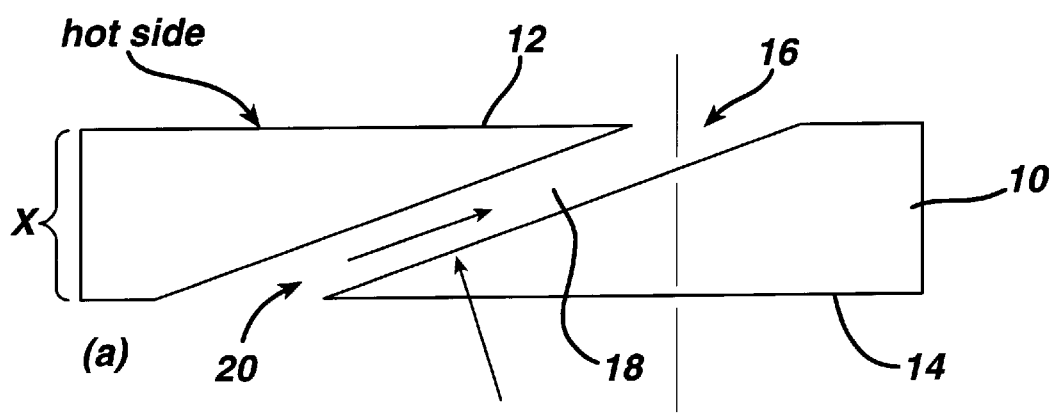
FIG. 1 is a simplified, cross-sectional view of a typical substrate which contains film cooling holes.

The film cooling holes which are in the substrate extend from one surface to another surface, and may constitute a variety of shapes. The throat of the hole is usually substantially cylindrical. The break-out region of the hole is the region at which the hole terminates at the substrate surface, and is sometimes referred to herein as the "exit site". The break-out region is often elliptic or diffusion-shaped, although other hole exit geometries are also possible. (As used herein, the break-out region is characterized by the widest, planar dimension from one edge to another, e.g., the break-out diameter of an ellipse.) The holes usually extend from a backside (e.g., internal) surface to a higher-temperature or "hot" surface". (The backside surface is sometimes referred to herein as the "cooler surface" or "cool surface"). In the case of turbine engines, the hot surface is typically exposed to gas temperatures of at least about 1000° C., and more often, at least about 1400° C. A cross-section of an exemplary substrate 10 is depicted in FIG. 1, illustrating one passage hole, e.g., a "film cooling hole". (As further described below, various articles such as turbine engine components contain many film cooling holes, usually arranged in a row or array). Surface 12 is arbitrarily designated as the hot surface, while surface 14 is designated as the cooler surface. Passage hole 16 extends from cooler surface 14, through hole length section 18, out to hot surface 12. The passage holes are often inclined, relative to the hot surface.

The distance between the hot surface and the cooler surface is usually equivalent to the thickness of the substrate, and is designated as dimension "x" in FIG. 1. This distance is usually in the range of about 20 mils (508 microns) to about 1000 mils (25.4 mm), and most often, in the range of about 50 mils (1270 microns) to about 200 mils (5.1 mm). The average throat diameter of the holes is typically in the range of about 10 mils (254 microns) to about 100 mils (2540 microns). In some embodiments, the diameter is in the range of about 15 mils (380 microns) to about 50 mils (1270 microns). The holes are usually situated at an angle, e.g., inclined at an angle of at least about 10 degrees to about 60 degrees, relative to the horizontal surface of the substrate. More often (especially when they are situated in an engine part such as a combustor liner), the angle is in the range of about 20 degrees to about 45 degrees. The particular angle of the holes is of course determined by the shape of the component; its cooling requirements; and empirical observations (and/or computer-modeling results) of air flow patterns through and across sample substrates. The present invention is thought to be applicable for the full range of hole inclination stated above.

The depth of the passage hole (i.e., the "length" of a hole when it is situated at an angle) is usually in the range of about 20 mils (508 microns) to about 4000 mils (102 mm). This range includes the depth of the slot, discussed below. Typically, there are about 5 to about 200 holes per square-inch of the outer surface. It should be understood that the present invention is directed to any number of passage holes. Moreover, while the invention is especially suitable for individual rows of holes, other patterns of holes are also possible. Furthermore, the passage holes do not have to be film cooling holes, although those types of holes are the type usually found in turbine engine components.

Figure 2:
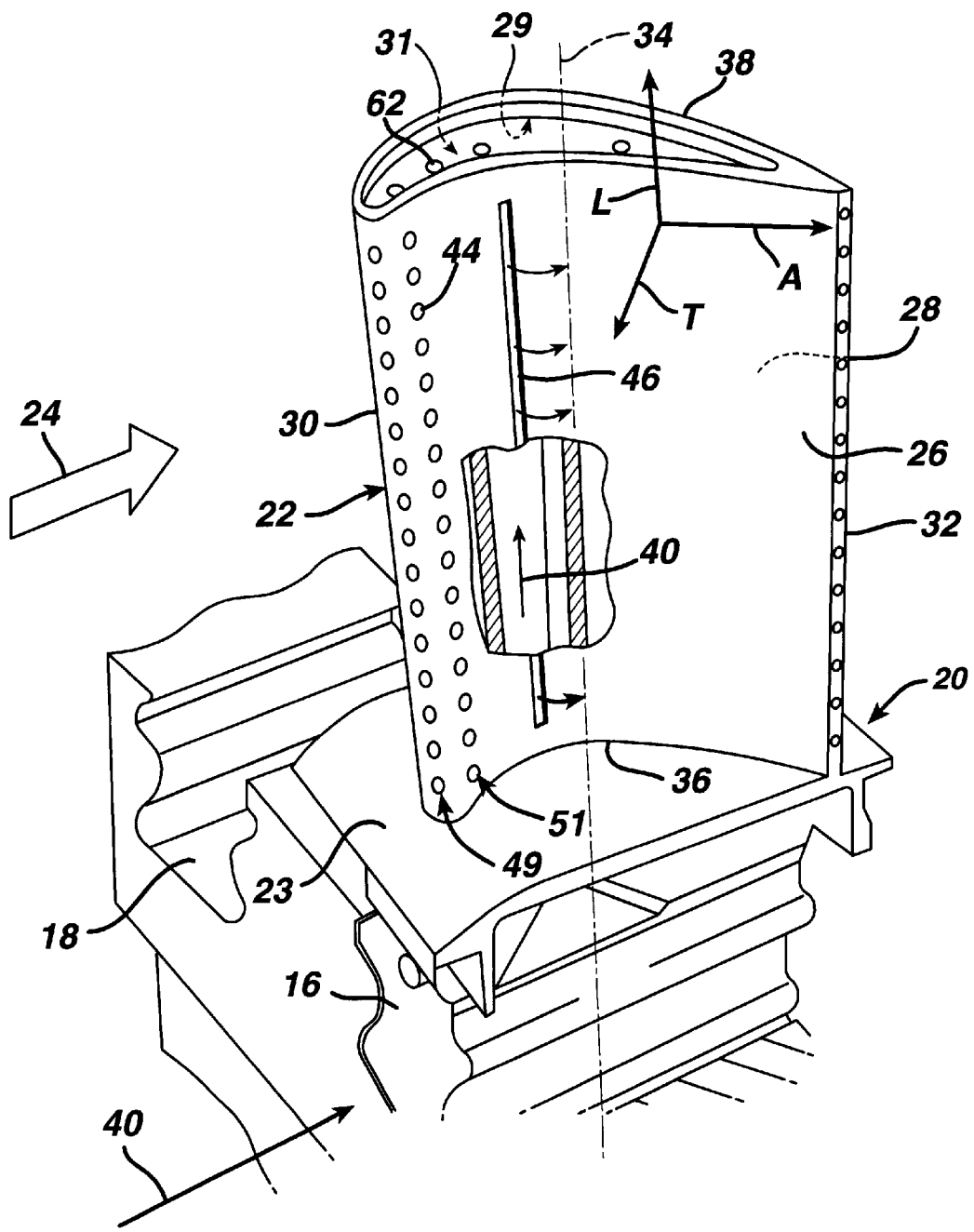
FIG. 2 is a perspective view of an exemplary gas turbine engine rotor blade which includes film cooling holes like those described in reference to the present invention.

FIG. 2 is a perspective view of an exemplary gas turbine engine rotor blade 20. The blade is similar to that described in FIGS. 1 and 2 of U.S. Pat. NO. 5,458,461 of C. P. Lee et al, which is incorporated herein by reference. Usually, a plurality of rotor blades 20 are attached to an annular rotor disk (not shown). As further described in the C. P. Lee patent, blade 20 includes a dovetail which is joined to a complementary dovetail on the rotor disk (not shown here). An exemplary airfoil 22 is integrally formed with the dovetail of the blade, and is joined thereto at a conventional platform 23. The platform provides an inner flow-path for combustion gases 24, which are conventionally channeled over the airfoil 22.

According to conventional design, airfoil 22 includes opposite pressure and suction side-walls 26 and 28. The sidewalls extend radially or longitudinally along a radial axis 34 from a root 36 to an outer tip 38. The sidewalls are joined together at an axially-upstream end along a leading edge 30, and at an opposite, axially downstream end along a trailing edge 32. Cooling air 40 is conventionally bled from a compressor (not shown). The cooling air is channeled upwardly through the blade dovetail and into airfoil 22 for the cooling thereof. The airfoil includes an improved film cooling arrangement, as described below.

Airfoil 22 is hollow, and includes a conventional cooling circuit, as described U.S. Pat. 5,458,461. Cooling air 40 is suitably channeled through the circuit for cooling the various sections of the airfoil in a conventional manner, as mentioned previously. Film cooling holes 44 are generally similar to those described above, e.g., the passage hole depicted in FIG. 1. With specific reference to FIG. 2, side-walls 26 and 28 are the "hot" surfaces. Their respective, opposite surfaces 31 and 29, blocked from view by the cap-portion of outer tip 38, are indicated in phantom. These interior surfaces 31 and 29 are the "cooler surfaces" of the airfoil.

Discrete film cooling holes 44 are usually arranged in rows, and are typically inclined at an angle, as described previously. The holes are longitudinally spaced apart from each other, and extend outwardly from the inner surfaces of the airfoil to the outer surfaces, e.g., side-walls 26 and 28. The angle of the holes is selected to reduce blow-off tendency, thereby improving film cooling effectiveness. Under ideal conditions, cooling air 40, discharged through each film cooling hole at the outer surfaces of the airfoil, forms a substantially-two dimensional sheet of coolant, having substantially continuous coverage. FIG. 2 also depicts an elongate slot 46. Such a slot is used in the prior art to reduce the velocity of the film cooling air, prior to discharge of the air to the exterior wall surfaces 26, 28.

As mentioned previously, thermal barrier coatings (TBC's) may be applied to the hot side of an airfoil, to further increase its operating temperature capability. As an example, a bond layer can first be applied over side-walls 26 and 28. The bond layer may be applied by a variety of conventional techniques, such as PVD, CVD, or a thermal spray process. Examples of thermal spray processes are vacuum plasma deposition, high velocity oxy-fuel (HVOF), or air plasma spray (APS). Combinations of thermal spray and CVD techniques may also be employed. A commonly-used bond layer is formed of a material like "MCrAlY", where "M" represents iron, nickel, or cobalt. Another type of bond layer is based on an aluminide or noble metal-aluminide material (e.g., platinum-aluminide). Such a material can be applied by various well-known techniques, such as pack diffusion processes. The TBC is then applied over the bond layer. In the case of turbine airfoils, the TBC is often a zirconia-based material, stabilized with an oxide such as yttria. The TBC is typically applied by a thermal spray technique, or by electron beam physical vapor deposition (EB-PVD).

For the present invention, a slot is formed at the exit site. In very general terms, the position of the slot within an airfoil can be expressed in relation to the following features: (a) a first surface over which is flowable a first fluid; and (b) an opposite second surface, spaced from the first surface along a transverse axis, over which is flowable a second fluid. The second fluid is hotter than the first fluid, and flows in a downstream direction along an axial axis disposed perpendicularly to the transverse axis. According to this terminology, the slot for this invention would extend partly inwardly and perpendicularly from the second surface toward the first surface, and longitudinally along a longitudinal axis disposed perpendicularly to both the transverse axis and the axial axis. (As further described below, the slot would initially extend through protective coatings in some preferred embodiments). The film cooling holes are spaced apart from one another, and extend outwardly from the first surface to the slot, in flow communication therewith, for channeling the film cooling air. The break-out regions of the holes are coplanar with the slot and inclined at a selected discharge angle relative to the longitudinal axis, for discharging the coolant into the slot.

The slot can be described more specifically with reference to FIG. 2, which includes orientation arrows for transverse axis T, axial axis A, and longitudinal axis L. A slot 46 is positioned like that of the present invention, but is quite different from the claimed slot, as described below. The slot extends partly inwardly and perpendicularly from each hot surface toward the cooler surface, i.e., from side-wall 28 to inner surface 29, and from side-wall 26 to its inner surface 31. The slot also extends longitudinally along a selected dimension of holes. As an example with reference to FIG. 2, a slot may extend longitudinally along longitudinal axis L, containing the exit sites of the holes in row 49. Another slot (generally parallel to the first slot) may also extend longitudinally along axis L, and this slot would contain the exit sites of the holes in row 51.

Figure 3:
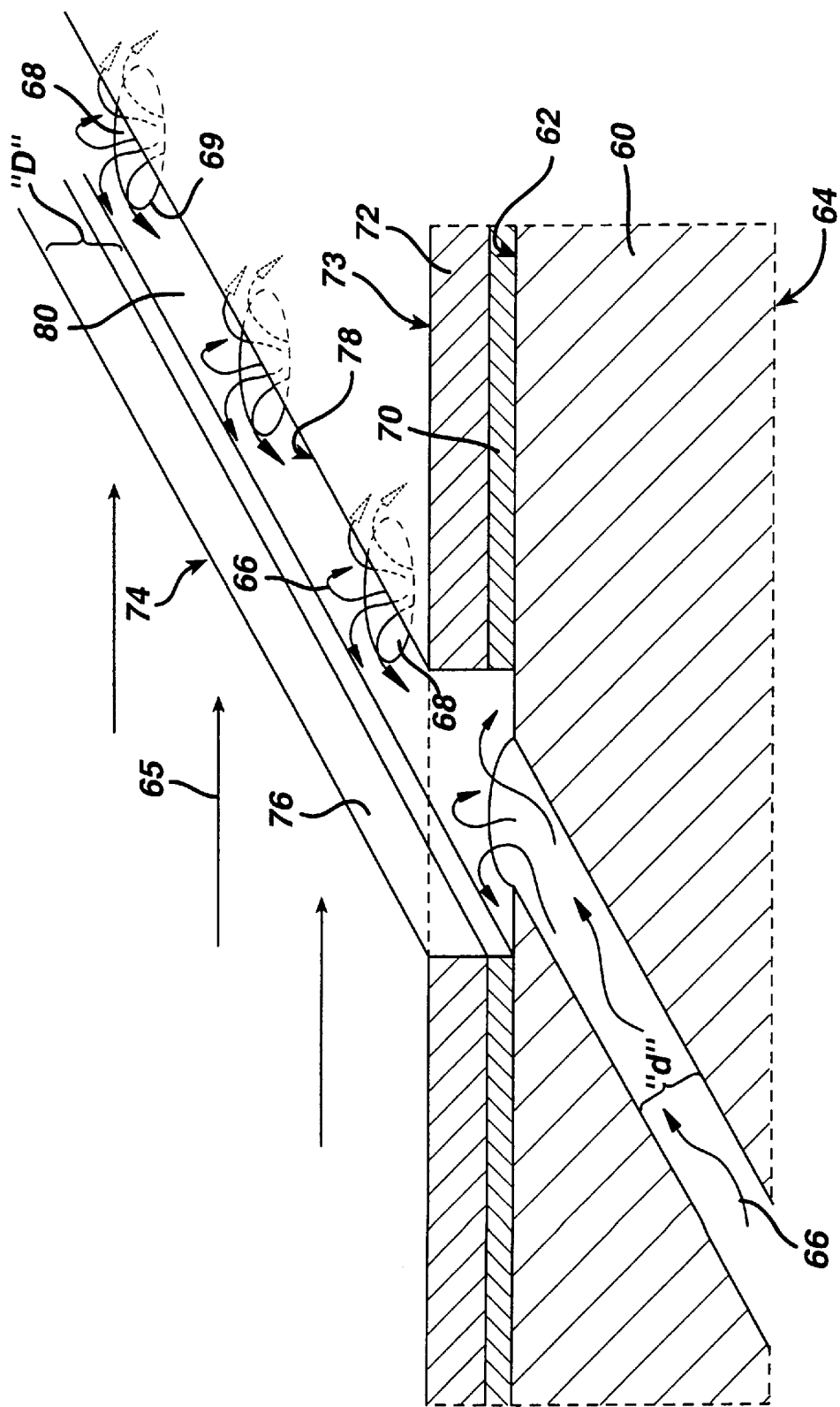
FIG. 3 is a cross-sectional view of a coated substrate which includes a slot at the exit site of film cooling holes.

In some preferred embodiments of the present invention, the slot is contained within the coatings which have been applied over the substrate, i.e., the hot surface. As described previously, these coatings are usually thermal barrier systems, which comprise a thermal barrier coating and an underlying bond layer. FIG. 3 provides one exemplary illustration for this embodiment. Substrate 60 represents the wall of any article which requires cooling on one or more surfaces, e.g., the wall of airfoil 22 in FIG. 2. The wall includes hot surface 62 and cooler surface 64. Combustion gases 65 are conventionally channeled over the article, i.e., over coated surface 62. Coolant air 66 flows upwardly from the cooler surface through film cooling holes 68. The break-out region of the holes is designated as element 69 in FIG. 3. The holes have an average throat diameter d.

Substrate 60 is partially coated with a bond layer 70 and an overlying TBC 72. In this embodiment, slot 74 is formed within the bond layer and TBC, and has a depth D. Usually (but not always), the side-walls 76, 78 of the slot are substantially perpendicular to surface 62 of the substrate. (Thus, the side-walls are usually substantially perpendicular to the bottom surface 80 of slot 74).

In some embodiments, the depth D of the slot is less than the average throat diameter d of the film cooling holes. In some especially preferred embodiments, the depth D of the slot is less than about 50% of the average throat diameter d. These relative dimensions are in marked contrast to slots used in the prior art, which are often very deep. For example, in U.S. Pat. No. 5,458,461, the depth of the slot is preferably at least twice the hole diameter. Such a deep slot may sometimes result in the need for strengthening of the substrate, e.g., greater wall thicknesses.

As shown in FIG. 3, slot 74 serves as a "spillway" trench for coolant air exiting cooling holes 68. Side-wall 78 is considered to be the "downstream" wall (relative to combustion gas flow 65), and it provides an obstruction to the flow of the coolant air. As a result, the coolant is generally forced to spread laterally into the slot and along hot surface 73 (i.e., surface 62 as-coated). The coolant thus stays in close contact with the hot surface, rather than separating from it quickly, and undesirably mixing with the combustion gases. This in turn results in greater cooling effectiveness for the component.

Various techniques may be used to form a slot like that described above. In one embodiment, each hole within a row of holes is first covered with a curable plug material, to prevent the deposition of any protective coating material into the holes. The plug material is soft and pliable, and can be inserted into each hole manually, or with the aid of suitable tools or machinery. In preferred embodiments, the material is inserted into the holes from the hot surface, i.e., from surface 62 of FIG. 3 (prior to the deposition of the coatings). Thus, access to the backside (surface 64) is unnecessary for this process.

The plug material should be capable of withstanding temperatures used in subsequently coating the substrate with various coatings, as further described below. Various elastomeric materials can be used, e.g., silicone-based resins or acrylic materials. An example of a suitable material for many embodiments is Machbloc™, which is based on a polysiloxane and a silica filler. Thermosetting resins may be used when the component is to be subsequently coated by higher-temperature deposition techniques. These resins are often heat-resistant to at least about 400° C. (Such materials would typically be used in an uncured (non-cross-linked) or partially-cured state, to keep them pliable, and to facilitate their insertion into the film cooling holes). Those skilled in the art understand that the plug materials often include various additives, e.g., plasticizers, fillers, binders, curing agents, and the like.

After the holes have been filled with the plug material, the material is cured (hardened) by conventional means. Some of the materials mentioned above cure in large part with the aid of a catalyst. Other materials require the application of heat. When needed, the heating step can be carried out by various techniques, e.g., a convection oven, heat lamp, and the like.

A mask is then applied over the holes that have been filled, e.g., a row of holes. The mask usually has dimensions which are substantially identical to the pre-selected dimensions of the slot. (In the case of holes which are in some pattern other than a row, the mask will be shaped to cover that particular pattern of holes). The mask can be formed of various materials, depending in part on the deposition temperatures used in subsequent coating processes, as described previously. For example, the mask could be a strip of the curable plug material described above, e.g., Machbloc™, or one of the thermosetting polymers ( in cured or partially cured form). When higher heat-resistance is desired, the mask could be a metal or ceramic bar having the desired dimensions. The mask could be temporarily fastened to the substrate by various techniques, e.g., clamps or adhesives.

When the mask is in place, the protective coating or multiple coatings are applied over the substrate and the mask. In the case of a TBC system, a bond layer ("bond coating") is applied first, followed by the TBC itself, as described previously. The bond layer completely covers the substrate, except for the area blocked by the mask, and the TBC completely covers the bond layer. The thickness of bond layer will depend on various factors, such as the use conditions for the component; the level of oxidation protection required; and the desired depth of the slot. Usually, the thickness will be in the range of about 25 microns to about 1000 microns. In some embodiments, multiple bond layers may be used.

The thickness of the TBC will depend in part on the thermal environment to which the component will be exposed; the thickness of the bond layer; and on the desired depth of the slot. Usually its thickness will be in the range of about 125 microns to about 2500 microns. In preferred embodiments for end uses such as airfoil components, the thickness is often in the range of about 250 microns to about 1150 microns. Those skilled in the art are familiar with the details involved in practicing any of the deposition techniques described above. As an example, deposition temperatures for the substrate and the coating material can be modified (e.g., in the case of plasma spray) to accommodate the heat-resistance of the mask. Related references for suitable coating techniques include Kirk-Othmer's *Encyclopedia of Chemical Technology*, 3rd Edition, Vol. 15, (1981) and Vol. 20 (1982); Ullmann's *Encyclopedia of Industrial Chemistry*, Fifth Edition; Volume A6, VCH Publisher (1986); Scientific American, H. Herman, September 1988; and U.S. Pat. No. 5,384,200 (incorporated herein by reference).

After the coatings have been deposited on the substrate, the mask is removed. Usually, the mask can be detached manually without any special effort. Solvents, oils, and/or commercial etching solutions could be used to lower the adhesion of the mask to the substrate. Removal of the mask effectively uncovers or "produces" the slot at the exit site of the film cooling holes. Some preferred embodiments for this technique include holes that have an average throat diameter greater than about 750 microns.

The plug material can then be removed by a variety of techniques. For example, it can often be burned out by pyrolysis. The required temperature will of course depend on the type of resinous material used. The heat can be supplied by any conventional technique, such as an oven or torch. (The heating technique should be one which will not damage the substrate or any coatings applied thereon). Alternatively, a solvent or solvent mixture (sometimes heated) which dissolves or solubilizes the plug material could be employed. The solvent could be applied to the substrate, or the substrate could be immersed in the solvent. Any remaining residue can usually be removed by agitation, alone or in combination with brushing techniques or gas-blasts (e.g., of air). (In some embodiments, the plug material could be removed when the mask is removed. For example, a mask made of a polymeric material could be pyrolyzed under burn-out conditions sufficient to simultaneously remove the plug material).

Figure 4:
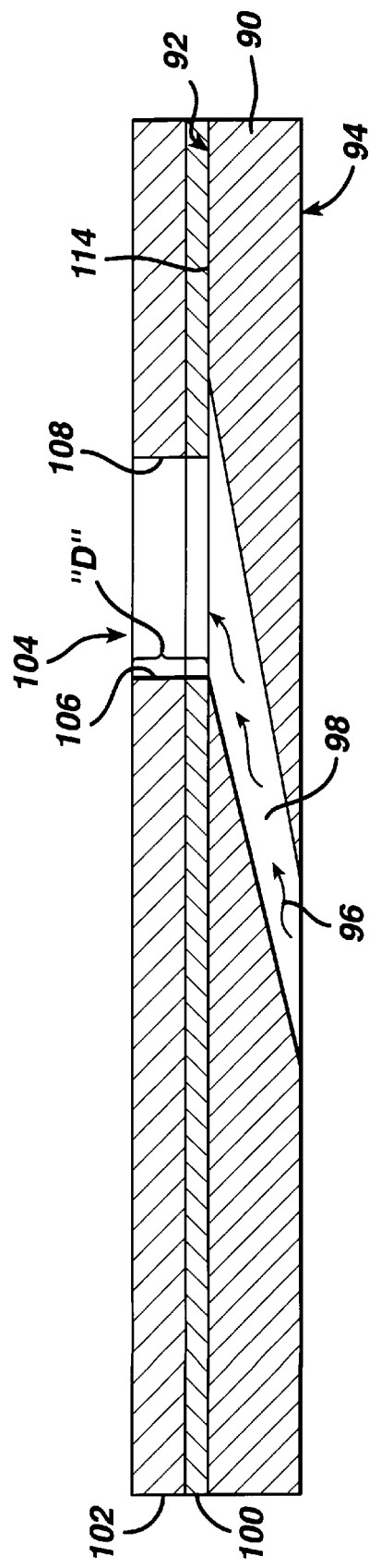
FIG. 4 is a partial, cross-sectional view of an alternative embodiment to that of FIG. 3.

While FIG. 3 depicts a slot which is generally open and rectangular in shape, variations are possible. For example, various shaped features could be incorporated into the slot, to advantageously influence the passage of film cooling air. (These features will sometimes collectively be referred to herein as "film coolant obstructions") One example of a slot modified in this manner is provided in FIGS. 4 and 5. Many of the features in these figures are identical to those in FIG. 3. FIG 4 is a partial, cross-sectional view, depicting one of what is usually a line of holes. Substrate 90 again represents the wall of an article, e.g., an airfoil, which includes hot surface 92 and a cooler surface 94. As in FIG. 3, the substrate is partially coated with a bond layer 100 and an overlying TBC 102, although other types of coatings are possible. Slot 104, having side-walls 106 and 108, is formed within the thickness of the coatings, and has a depth D. Coolant air 96 flows upwardly from the cooler surface through film cooling holes 98. The film cooling holes depicted in FIG. 5 happen to be diffusion-shaped, but could be other shapes as well. Combustion gases 95 are conventionally channeled over the substrate.

Figure 5:
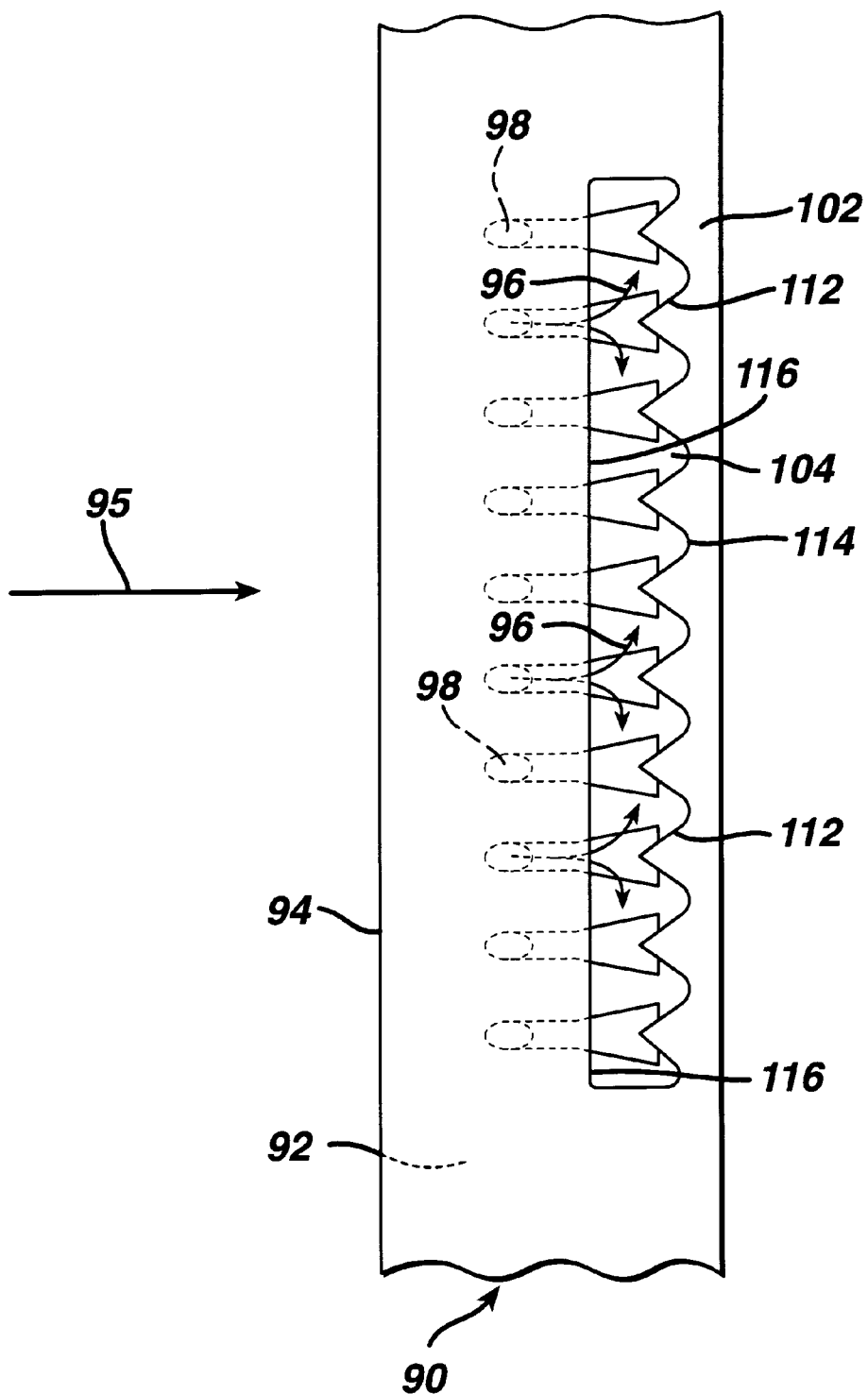
FIG. 5 is a cross-sectional, top view of the alternative embodiment depicted in FIG. 4.

In this alternative embodiment, the coatings have been patterned into "delta" shaped-features 112, as shown in FIG. 5. The delta features can have a base 114, and individual peaks 116. The dimensions of the delta features can vary significantly, and their orientation within slot 104 can also vary. (Based on the teachings presented herein, those skilled in the art can perform simulated or actual coolant flow tests. These tests would help one to readily determine the effect of varying the shape or orientation of a delta-like feature on coolant flow relative to hot surface 92.) In the exemplary FIG. 5, each peak of a delta feature is directed toward an opposing cooling hole 98. In this manner, the delta feature lies directly in the path of coolant flow exiting the sites. The shapes thereby function as an intended obstruction, disrupting the flow of coolant. This rather sudden disruption of the flow of coolant results in the coolant stream contacting a greater area of the hot surface, while minimizing the tendency to mix with the combustion gases, leading to greater cooling effectiveness.

Various techniques are available for incorporating delta features or other shapes into slot 104. As an example, the features could be pre-formed (e.g., cast) from a metallic material, and then brazed or otherwise attached in the desired position. In preferred embodiments, the features are formed during the deposition process (or processes) used to apply coatings to the substrate. As an example, the mask described above (e.g., in reference to FIG. 3) could be patterned in the "negative" image of the delta features of FIG. 5. Thus, after the coatings (e.g., a TBC system) are applied, removal of the mask results in the desired pattern. Alternatively, a mask having a typical shape, e.g., rectangular, could be applied to the surface and then cut to shape by conventional techniques.

Figure 6:
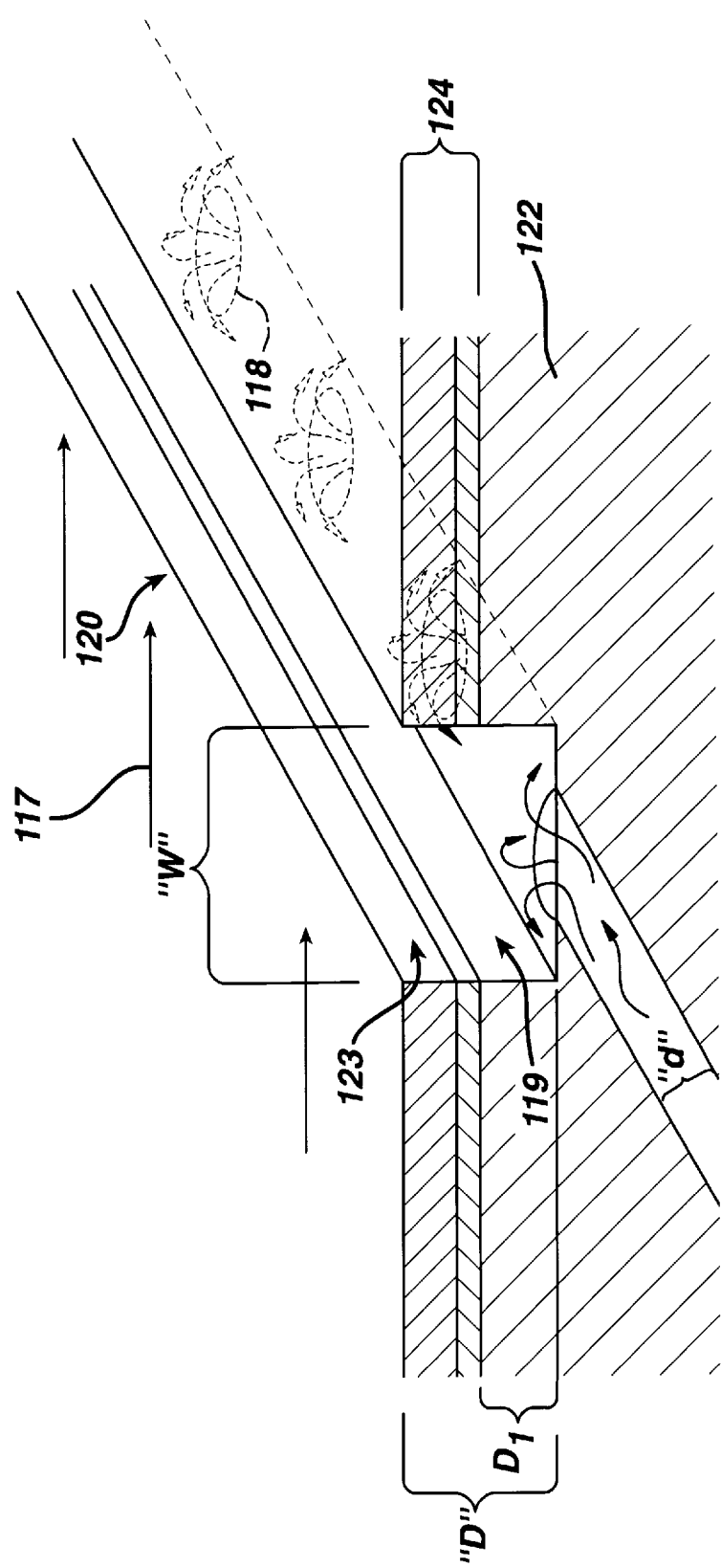
FIG. 6 is a cross-sectional view of another alternative embodiment to FIG. 3.

As another alternative, the slot described above can be formed partially within protective coatings, and partially within the substrate itself, as depicted in FIG. 6. The figure is meant to be identical to FIG. 3 in all aspects (e.g., combustion gases 117) not specifically described herein. A partial slot 119 is first formed within the substrate at a position which is usually directly over a line of film cooling holes 118. (The bottom surface of the partial slot is in fluid communication with the film cooling holes). Thus, the midpoint of the width W of the slot is usually located over the approximate center of each hole. Various techniques can be used to form such a slot. For example, it can be formed during the casting process for the component. Alternatively, it can be formed by a machining technique, such as milling or electro-discharge machining (EDM). The partial slot could also be formed by laser cutting.

The dimensions of the partial slot will depend on various factors, such as the shape, diameter, and length of the film cooling holes; and the thickness of coatings which will subsequently be applied over the substrate. As noted previously, simulated or actual coolant flow tests can be readily carried out to determine the most appropriate dimensions of the partial slot. It should also be noted that the film cooling holes could be formed prior to formation of the partial slot, or after its formation.

After the formation of the partial slot (and film cooling holes, if not already present), the holes are covered with a plug material, which can be cured. A mask is then applied over the filled holes, as described previously. The mask usually has dimensions which are sufficient to form a slot having pre-selected dimensions, i.e., taking into account the depth $D_1$ of the partial slot. Once the mask is in place, the protective coating or multiple coatings (e.g., the TBC system) are applied over the substrate and the mask. Again, the thickness of these coatings depends in part on the end use conditions for the substrate, and on the desired depth of the slot.

After deposition of the coating or coatings, the mask is removed, and the plug material is removed from the holes, e.g., by pyrolysis. The resulting slot 120 has a total depth D, as shown in FIG. 6. The total depth includes the partial slot of depth $D_1$ within substrate 122. (In some preferred embodiments, the depth $D_1$ of the partial slot is less than about 750 microns.) The total depth includes the additional slot depth $(D-D_1)$ of the remaining slot section 123 (which is coextensive with the partial slot). This additional slot depth is equivalent to the average depth of the coatings, e.g., TBC system 124. As mentioned previously, some preferred embodiments dictate that the slot be relatively shallow, as compared to slots of the prior art. In other words, the total depth D of the slot is preferably less than the average throat diameter d of the film cooling holes, and more preferably, less than about 50% of the average throat diameter d. The ratio of the depth of the partial slot to the coating depth (i.e., $D_1:(D-D_1)$ is usually in the range of about 90:10 to about 10:90, and more preferably, in the range of about 40:60 to about 60:40. In some instances, this embodiment is especially preferred for film holes which have throat diameters in the range of about 250 microns to about 800 microns.

Another embodiment of this invention is directed to an article in the form of a substrate, e.g., a wall adaptable for use in a gas turbine engine. The article comprises:

(I) a first surface exposed to a first fluid;

(II) a second surface exposed to a hotter second fluid, spaced from the first surface;

(III) at least one row or other pattern of passage holes extending through the substrate from the first surface to a slot on the second surface; said holes having an average throat diameter d; and (IV) at least one coating, covering the portion of the second surface exclusive of the slot;

As described previously, the slot extends partly inwardly and perpendicularly from the second surface toward the first surface. Moreover, the bottom surface of the slot is substantially parallel to the second surface (i.e., the hot surface). The bottom surface of the slot is also in fluid communication with the passage holes, and includes their break-out regions. Coolant issuing (exiting) from the passage holes stays in close contact with the hot surface, rather than separating from it quickly, and undesirably mixing with the combustion gases. This in turn results in greater cooling effectiveness for the component.

As also described previously, the slot is typically rectangular, and has side-walls which are substantially perpendicular to the hot surface of the substrate. (Depending on how the slot is formed, the slot walls may not always be uniformly perpendicular. For example, a casting process may result in small fillets near the corners of the slot walls with the bottom surface). The width of the slot is usually 100% to about 250% of the break-out diameter of the holes, relative to the selected direction of the hotter second fluid.

Very often, the center of each passage hole is approximately coincident with the midpoint of the width of the slot. However, the holes do not have to be aligned with the center of the slot. They could instead be situated closer to one of the sidewalls of the slot, depending on various fluid flow considerations, as described above.

As described above, the slot (i.e., its depth) may be located entirely within a coating deposited on the substrate, with the substrate's hot surface serving as the slot bottom. In the case of a turbine engine substrate, the coating is typically a TBC system. Alternatively, the lower portion of the slot may be located within the substrate surface itself, while the upper portion of the slot is located within the coating thickness. In some preferred embodiments, the depth of the slot is less than the average throat diameter of the passage holes.

These examples are merely illustrative, and should not be construed to be any sort of limitation on the scope of the claimed invention.

EXAMPLE 1

This series of tests was performed in a warm wind tunnel, which was a 4 inch (10.2 cm)×3 inch (7.6 cm) rectangular-shaped enclosure having a length of about 2–3 feet (61 cm–168 cm). The enclosure is attached to a 30 inch (76 cm)-diameter plenum vessel fed from a compressor system. A bell-mouth inlet directs the flow from the plenum into the wind tunnel. The hot gas air was generally maintained at about 560° F. (293° C.) for all tests. The hot gas flow rate was set at 3.5 lbm/sec (1.59 kgm/sec) for these tests, which resulted in a wind tunnel-Reynolds number of 630,000. (The Reynolds number is a conventional, non-dimensional flow parameter). Film cooling flow was controlled separately from a second compressor. The cool air flow was dried, filtered, metered, and chilled to about 90° F. (32.2° C.). In these experiments, the flow rates for the film cooling air were between about 0.010 and 0.025 lbm/sec. Such a flow rate resulted in film hole blowing ratios (M) of 0.9 to 1.30. The film hole pressure ratios were in the range of 1 to 1.5, and the momentum flux ratios were in the range of 0.5 to 1. (A film row flow rate of 0.015 lbm/sec corresponds to an individual film hole Reynolds number of 20,000). The coolant-to-gas density ratio was about 1.8.

All test plates included a single row of 11 film holes, either round or diffusion-shaped. All holes had throat diameters of 0.07 inch (1.78 mm). The span-wise spacing of the hole center-lines was 0.25 inch (6.35 mm), which results in a pitch-to-diameter ratio of 3.57. All holes were axial in orientation, and at an angle of 30 degrees relative to the substrate surface (i.e., relative to surface 64 in FIG. 3).

Figure 7:
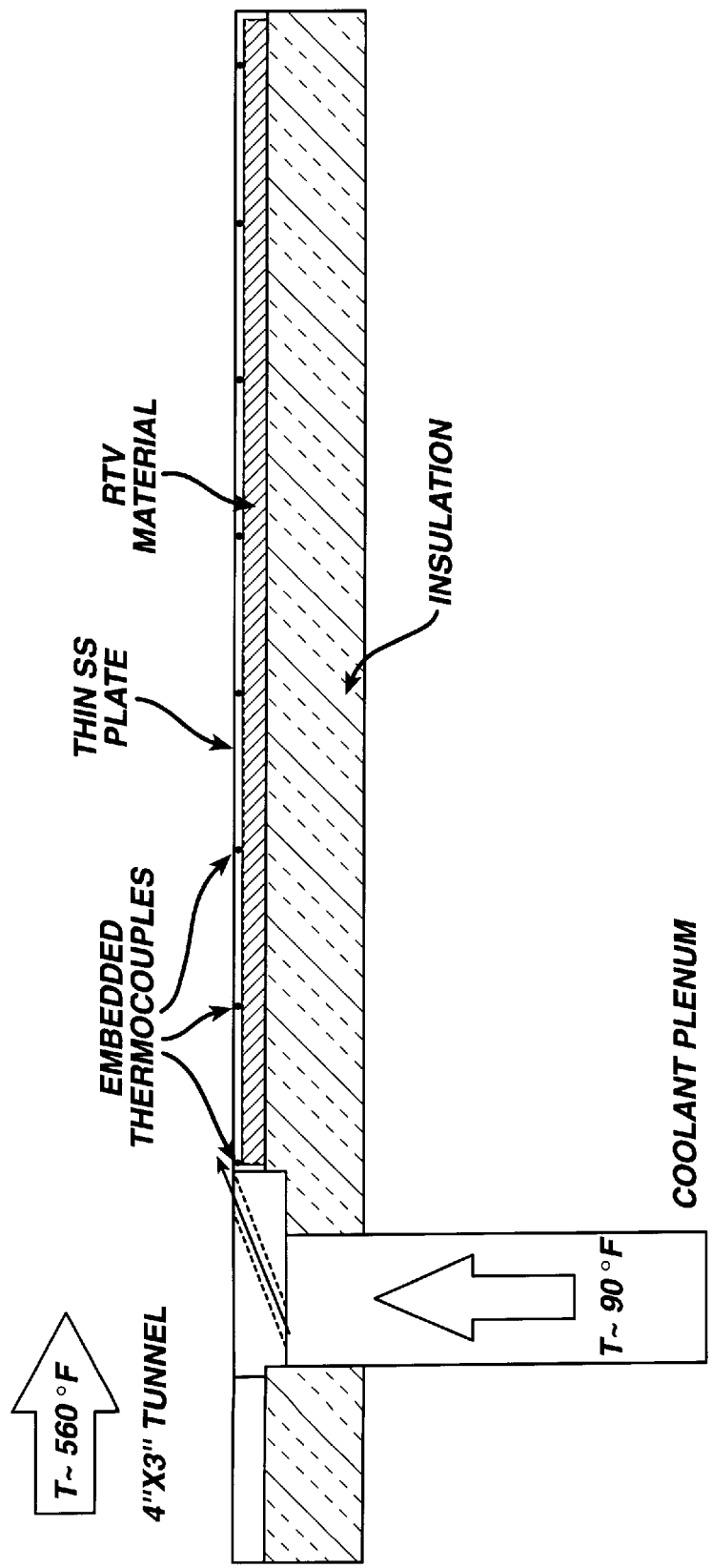
FIG. 7 is an elevated, cross-sectional view of a test apparatus used to measure film cooling effectiveness.

A stainless steel test plate (about 1.52 mm thick) was used as the "hot" surface. It was positioned downstream of the film hole. An array of thermocouples was embedded within the test plate at selected locations. One row of thermocouples was located along the center-line, downstream of the center film hole. These thermocouples were used to determine the center-line film effectiveness described herein. The test plate was supported by an RTV layer and a thermal insulation layer, to provide a substantially adiabatic condition. The apparatus is illustrated, in simplified form, in FIG. 7. Lateral conduction effects between thermocouples are corrected for in the data reduction. The local adiabatic film effectiveness is defined as $$\eta=(T_{recovery}-T_{surface})/(T_{recovery}-T_{coolant})$$

Figure 8:
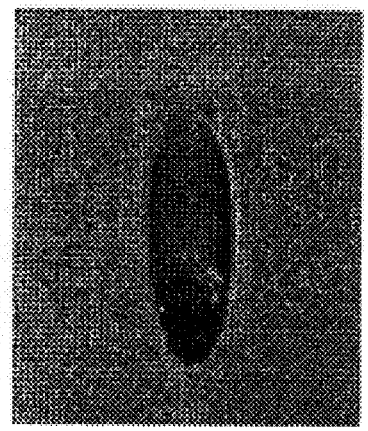
FIG. 8 is an enlarged photograph of an un-coated, round film cooling hole through a metal substrate.

The local recovery temperatures were first measured as the plate surface temperatures without any film cooling, at steady flow and thermal conditions. A measurement of the surface temperatures with film cooling then allows calculation of the local film-cooling effectiveness. The holes in the test plate were formed by electrode-discharge machining (EDM). A photograph of a typical hole is provided as FIG. 8.

Figure 9:
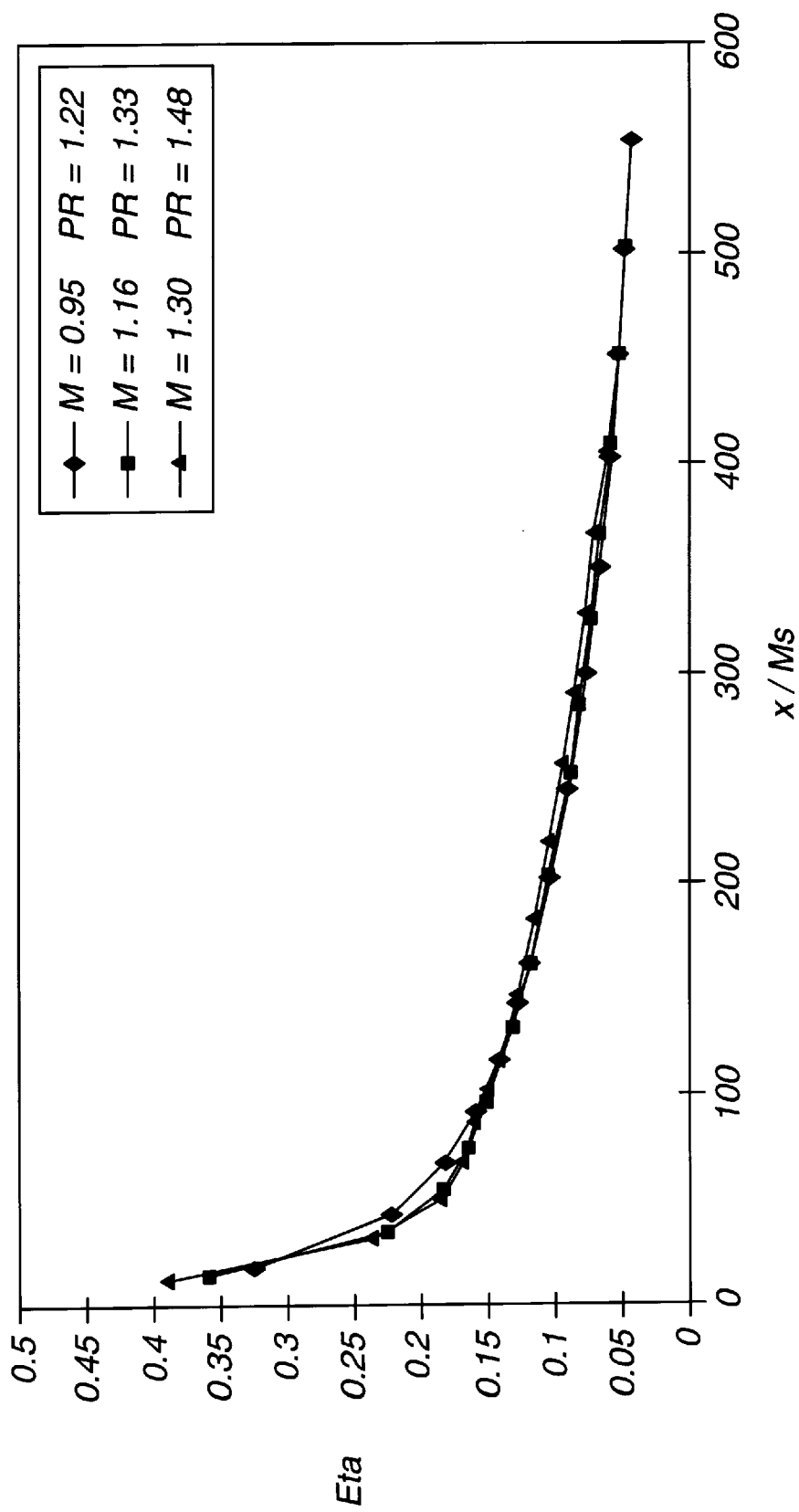
FIG. 9 is a graph of film cooling effectiveness as a function of a lateral dimension/blowing ratio value, for an embodiment outside the scope of this invention, for experimental purposes.

Using the apparatus described above, baseline (comparative) tests were performed, in which the substrate was un-coated, and did not contain any slot over the row of holes. FIG. 9 provides a graphical representation of the data for this comparative example. The x-axis represents x/Ms, wherein x is the axial distance measured along the surface from the film hole exit to a selected measurement point downstream. In the equation, M is the blowing ratio; and "s" is the equivalent two-dimensional slot width for the film row exit flow area (equal to about 0.0157 in. (0.40 mm). (The x-axis values thus represent the "x" distance from the exit point of each film hole, measured downstream of the hole). The y-axis represents "Eta", which is a conventional measurement for adiabatic film effectiveness. Film effectiveness for this comparison example was measured over three blowing ratios, as depicted in FIG. 9.

EXAMPLE 2

Figure 10:
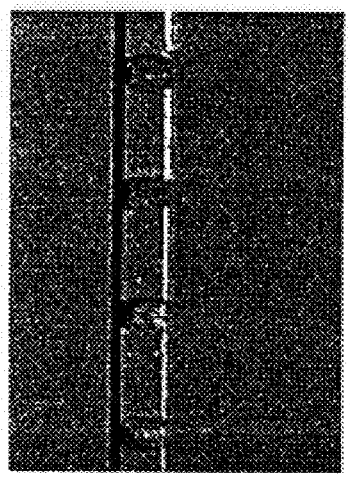
FIG. 10 is an enlarged photograph of a metal mask positioned over a row of film cooling holes.

A superalloy substrate containing a row of film holes was used for this example. The experiment models an embodiment of the present invention, i.e., using a slot at the exit site of the film cooling holes. A metal mask was placed over the row of holes, as depicted in the photograph of FIG. 10. The mask was fastened to the substrate surface with an intervening, curable layer of RTV. The mask modeled the effect of a trench which would typically be formed within a bond layer and a TBC. The depth of the trench was about 0.030 inch (0.76 mm), and its width was about 140 mils (3.56 mm). This width was the same dimension as the major axis of the elliptic hole break-out.

Figure 11:
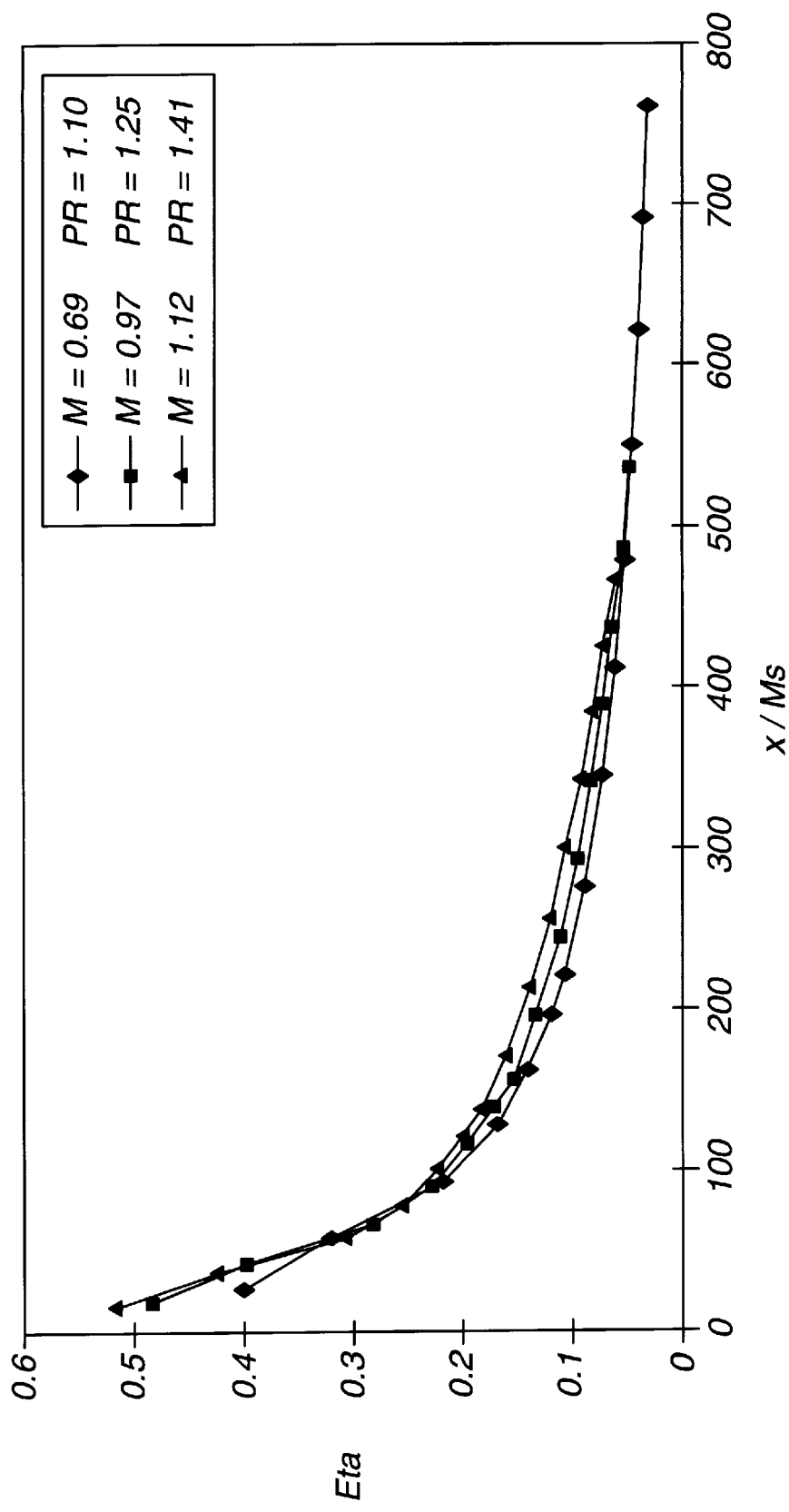
FIG. 11 is another graph of film cooling effectiveness as a function of a lateral dimension/blowing ratio value, for an embodiment within the scope of this invention.

Wind tunnel tests like those of Example 1 were performed here, using the hot gas flow rates and cool air flow rates used in that example. The results for round holes are depicted graphically in FIG. 11. The average film effectiveness enhancement factor was calculated by integrating the average area under the curves in the figure, and then proportionately comparing that area to the integration of the curves (averaged) in FIG. 9. The enhancement factor was 1.35, demonstrating an increase in cooling effectiveness of about 35%. Such an enhancement demonstrates the advantages of providing a slot as a modified exit site within protective coatings applied to the substrate. In addition to cooling effectiveness, the efficient use of coolant air has other advantages. In the case of a turbine engine, for example, a decrease in the amount of air needed for film cooling results in a greater proportion of air available to flow into the pre-mixer section of the combustion chamber. This in turn can decrease the amount of pollutants produced during combustion.

As described above, the slot used in this invention can be incorporated in the film hole-cooling region when the substrate (e.g., an airfoil) is first coated. Alternatively, the slot can be incorporated when worn or damaged protective coatings are being replaced during the service life of a component.

Preferred and exemplary embodiments have been described herein. However, other modifications of the invention shall be apparent to those skilled in the art from these teachings. Therefore, it is intended that all such modifications which fall within the true spirit and scope of this invention be secured by the appended claims.

All of the patents, articles, and texts mentioned above are incorporated herein by reference.

What is claimed:

1. A method for improving the cooling effectiveness of a fluid which flows through a row or other pattern of passage holes in a substrate, out to a high-temperature surface of the substrate, said method comprising the step of forming a slot over the holes, within the high-temperature surface of the substrate, wherein the holes have an average throat diameter d, and the slot has a depth D into the high-temperature surface of the substrate, and wherein the depth D of the slot is less than the average throat diameter d of the holes.

2. The method of claim 1, wherein the slot has side-walls substantially perpendicular to the high-temperature surface of the substrate.

3. The method of claim 1, wherein the substrate comprises more than one row of holes, and a different slot is formed over each row of holes.

4. The method of claim 1, wherein the substrate is covered by at least one coating through which the passage holes communicate to the high temperature surface, and the slot is contained within the coating.

5. The method of claim 4, wherein the slot is formed by a technique comprising the following steps:

(a) covering each hole with a curable plug material;

(b) curing the plug material;

(c) applying a mask over the row or pattern of holes, wherein the mask has dimensions substantially identical to pre-selected dimensions for the slot;

(d) applying the coating over the substrate and the mask;

(e) removing the mask; and (f) removing the plug material.

6. The method of claim 5, wherein the coating is a thermal barrier coating (TBC) system, comprising at least one bond layer for contact with the substrate, and an overlying thermal barrier coating applied over the bond layer.

7. The method of claim 6, wherein the bond layer of the TBC system is a noble metal-aluminide material or an MCrAlY material, where M is selected from the group consisting of Fe, Ni, Co, and mixtures of any of the foregoing.

8. The method of claim 7, wherein the noble metal-aluminide material is applied by a pack-diffusion process.

9. The method of claim 7, wherein the noble metal-aluminide material is platinum aluminide.

10. The method of claim 7, wherein the MCrAlY material is applied by a thermal spray process.

11. The method of claim 10, wherein the thermal spray process is selected from the group consisting of vacuum plasma deposition, high velocity oxy-fuel, and air plasma spray.

12. The method of claim 6, wherein the thermal barrier coating of the TBC system is applied by plasma vapor deposition, air plasma spray, or electron beam physical vapor deposition.

13. The method of claim 6, wherein the thermal barrier coating is zirconia-based.

14. The method of claim 5, wherein the curable plug material comprises a silicone polymer.

15. The method of claim 5, wherein each hole is covered with the curable plug material by at least partially filling the hole with the plug material from the high-temperature surface of the substrate.

16. The method of claim 5, wherein the plug material is removed from the holes by a technique which comprises pyrolysis.

17. The method of claim 1, wherein the average throat diameter d of the holes is greater than about 750 microns.

18. The method of claim 1, wherein the slot is formed by a technique comprising the following steps:

(i) providing a partial slot within the high-temperature surface of the substrate, said partial slot having a bottom surface substantially parallel to the substrate surface, and having a depth $D_1$; wherein the bottom surface is in fluid communication with the passage holes;

(ii) covering each hole with a curable plug material;

(iii) curing the plug material;

(iv) applying a mask over the row or pattern of holes within the partial slot, wherein the mask has dimensions substantially identical to pre-selected dimensions for the slot;

(v) applying a coating over the substrate and the mask;

(vi) removing the mask to uncover the slot, wherein the depth D of the slot includes the partial slot of depth $D_1$, and an additional slot depth $(D-D_1)$; and (vii) removing the plug material.

19. The method of claim 18, wherein the partial slot is preformed on the substrate by a casting process.

20. The method of claim 18, wherein the partial slot is formed by removing a selected portion of substrate material after formation of the substrate.

21. The method of claim 20, wherein the selected portion of substrate material is removed by a machining technique or laser cutting technique.

22. The method of claim 18, wherein the depth $D_1$ of the partial slot is less than about 750 microns.

23. The method of claim 18, wherein the coating is a TBC system.

24. The method of claim 23, wherein the TBC system comprises a bond layer and a thermal barrier coating.

25. A method for improving the cooling effectiveness of a fluid which flows through at least one row of passage holes in a substrate, out to a high-temperature surface of the substrate, comprising the following steps:

(I) covering each hole with a curable plug material;

(II) curing the plug material;

(III) applying a mask over the row of holes, wherein the mask has dimensions substantially identical to pre-selected dimensions for a slot;

(IV) applying a thermal barrier coating (TBC) system over the substrate and the mask, said TBC system comprising a bond layer and a thermal barrier coating;

(V) removing the mask to uncover the slot; and (VI) removing the plug material;

wherein the passage holes have an average throat diameter, and the dimensions of the mask are selected to provide the slot with a depth that is less than the average throat diameter of the passage holes.

26. The method of claim 25, wherein the substrate is a component of a turbine engine formed from a superalloy material.

27. The method of claim 26, wherein the thermal barrier coating is zirconia-based, and the TBC system is applied by a plasma spray technique.

28. An article in the form of a substrate, comprising:

(I) a first surface exposed to a first fluid;

(II) a second surface exposed to a hotter second fluid, spaced from said first surface;

(III) at least one row or other pattern of passage holes extending through the substrate from the first surface to a slot on the second surface; said holes having an average throat diameter d, and said slot having a depth D; wherein the depth D is less than the diameter d; and (IV) at least one coating, covering the portion of the second surface exclusive of the slot;

wherein the slot has a bottom surface substantially parallel to the second surface, and wherein the bottom surface of the slot is in fluid communication with the passage holes.

29. The article of claim 28, wherein the slot is substantially rectangular, and the side-walls of the slot are substantially perpendicular to the second surface of the substrate.

30. The article of claim 28, wherein the depth D of the slot is less than about 50% of the average throat diameter d of the passage holes.

31. The article of claim 28, wherein the holes are substantially elliptical-shaped at the second surface, and have a break-out diameter, and wherein the hotter second fluid is channeled over the second surface in a selected direction.

32. The article of claim 31, wherein the slot has a width which is 100% to about 250% of the break-out width of the holes, relative to the selected direction of the hotter second fluid.

33. The article of claim 31, wherein the center of each hole at the second surface is approximately coincident with the midpoint of the width of the slot.

34. The article of claim 28, wherein the slot is located within the coating.

35. The article of claim 34, wherein the coating is patterned.

36. The article of claim 35, wherein the pattern comprises delta-shaped features.

37. The article of claim 34, wherein the coating is a thermal barrier coating (TBC) system, comprising at least one bond layer for contact with the substrate, and an overlying thermal barrier coating applied over the bond layer.

38. The article of claim 28, wherein the slot is located within the coating and within the substrate.

39. The article of claim 38, wherein the slot comprises:

(i) a partial slot section within the high-temperature surface of the substrate, said partial slot section extending partly inwardly and perpendicularly from the second surface toward the first surface, and having a bottom surface substantially parallel to the second surface, and having a depth $D_1$ within the high temperature surface; wherein the bottom surface is in fluid communication with the passage holes; and (ii) a remaining slot section disposed above the partial slot section and joined thereto, and within the coating, wherein the overall depth D of the slot includes the partial slot of depth $D_1$ and the additional slot depth $(D-D_1)$ of the remaining slot section.

40. A superalloy substrate within a turbine engine, comprising:

(I) a first surface exposed to a coolant fluid;

(II) a second surface intermittently exposed to a hot combustion gas, spaced from said first surface;

(III) at least one row of film cooling holes through which the coolant fluid flows, extending through the substrate from the first surface to a slot on the second surface; said holes having an average throat diameter d; and (IV) a zirconia-based thermal barrier coating system over the portion of the second surface exclusive of the slot;

wherein the slot has a bottom surface substantially parallel to the second surface, said bottom surface of the slot being in fluid communication with the film cooling holes, and wherein the depth of the slot is less than the average throat diameter of the film cooling holes.

41. A gas turbine airfoil, comprising the substrate of claim 40.

* * * * *